Feb. 19, 1952  A. G. ELLIS  2,586,628
APPARATUS FOR SHAPING CLAYWARE
Filed March 8, 1949  4 Sheets-Sheet 1

Inventor
Arthur Godfrey Ellis
By
Agent.

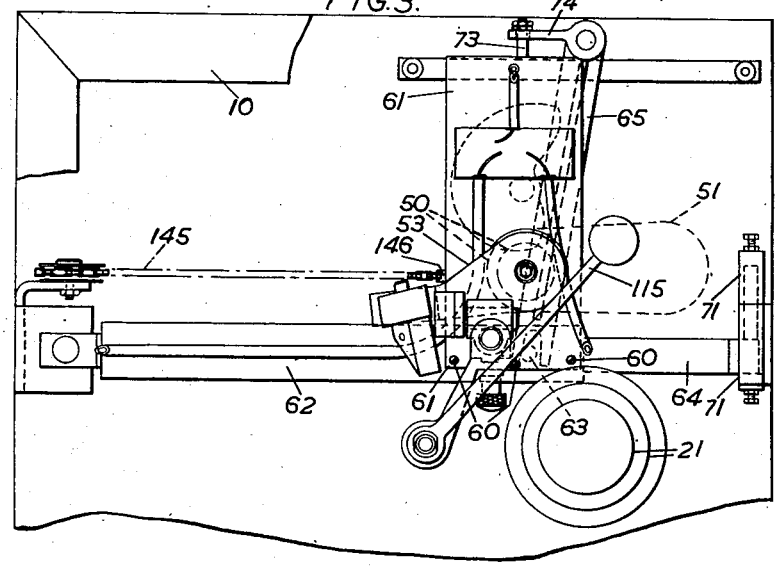
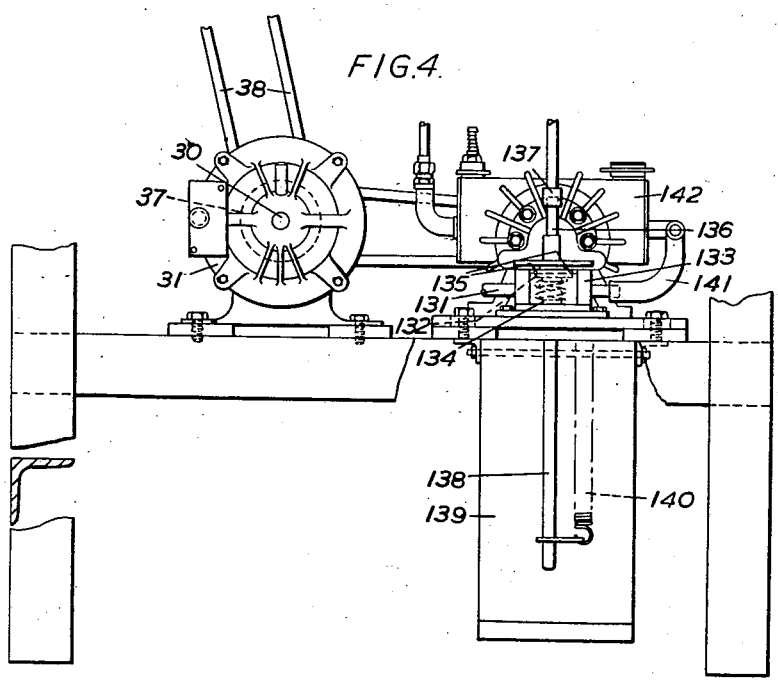

Feb. 19, 1952  A. G. ELLIS  2,586,628
APPARATUS FOR SHAPING CLAYWARE
Filed March 8, 1949  4 Sheets-Sheet 4

Inventor
Arthur G. Ellis
By
Jerome W. Paxton

Patented Feb. 19, 1952

2,586,628

UNITED STATES PATENT OFFICE 2,586,628

APPARATUS FOR SHAPING CLAYWARE

Arthur Godfrey Ellis, Longton, Stoke-on-Trent, England

Application March 8, 1949, Serial No. 80,260
In Great Britain March 12, 1948

9 Claims. (Cl. 25—24)

This invention relates to the shaping of clayware by turning involving new and improved mechanism in the nature of a lathe.

The object of the invention is to provide a form of apparatus which will turn the clay-ware pieces to the required form mechanically.

Another object of the invention is to provide an improved form of potter's lathe which will operate successfully on articles of extreme fragility without damaging them.

A further object is to provide an improved form of tool operating mechanism for a potter's lathe.

A still further object is to provide a potter's lathe which will operate semi-automatically, that is to say when a clay-ware piece has been placed in position and the machine started, the whole operation will proceed without further manual intervention until the piece is finished.

A still further object is to provide a potter's lathe which will be capable of turning not only the side walls of a hollow-ware piece such as a cup, but will also turn the foot or base of the piece to the required contour.

Another object is to provide an improved method of turning clay-ware articles, specially applicable to the turning of very fragile articles.

Further objects will be apparent from the ensuing description and claims.

In the accompanying drawings:

Figure 3 is a plan with the bench top broken away.

Figure 4 is a similar view to Figure 2 showing the lower part of the machine.

Figure 1:
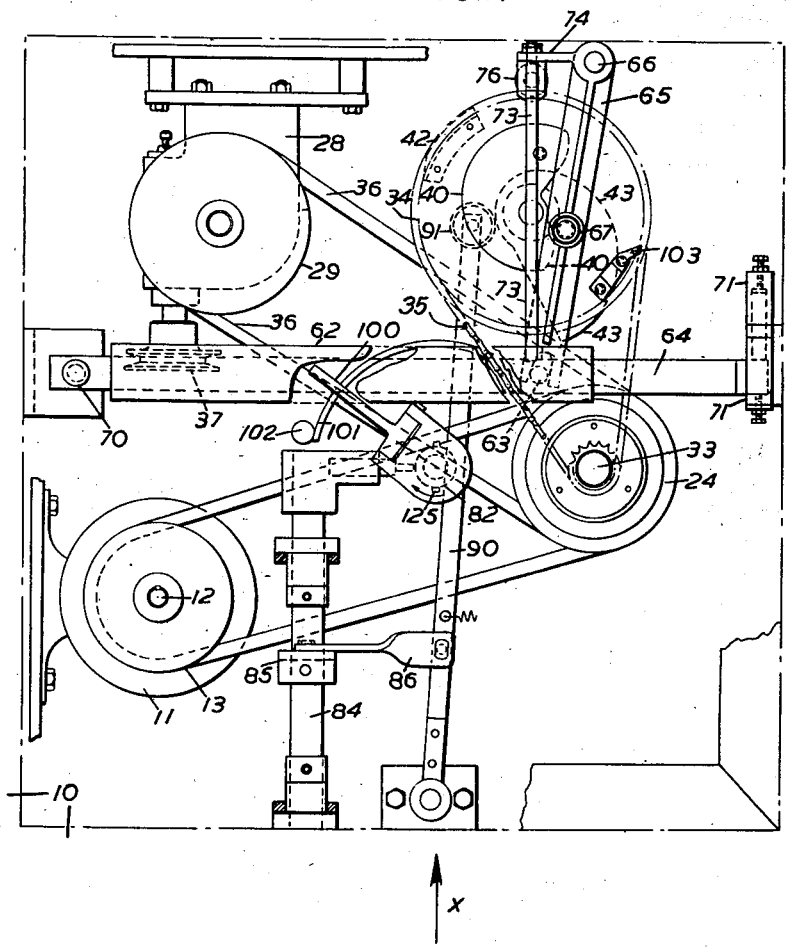
Figure 1 is a plan of the machine below the bench top.
Figure 2:
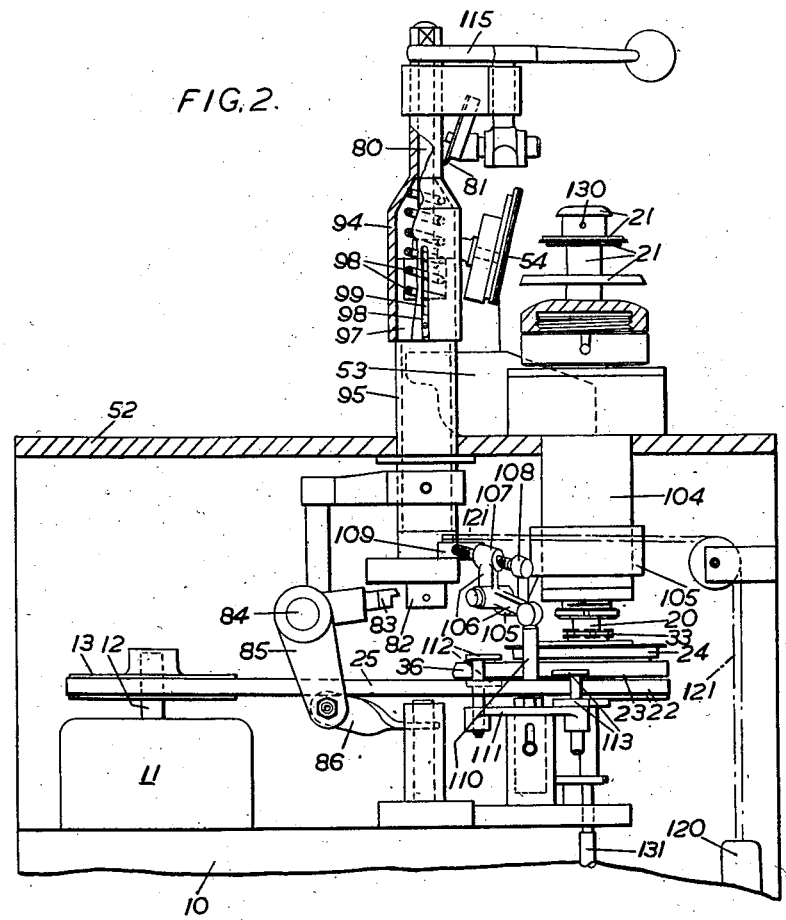
Figure 2 is an elevation of the upper portion of the machine looking in the direction of the arrow X on Figure 1.
Figure 5:
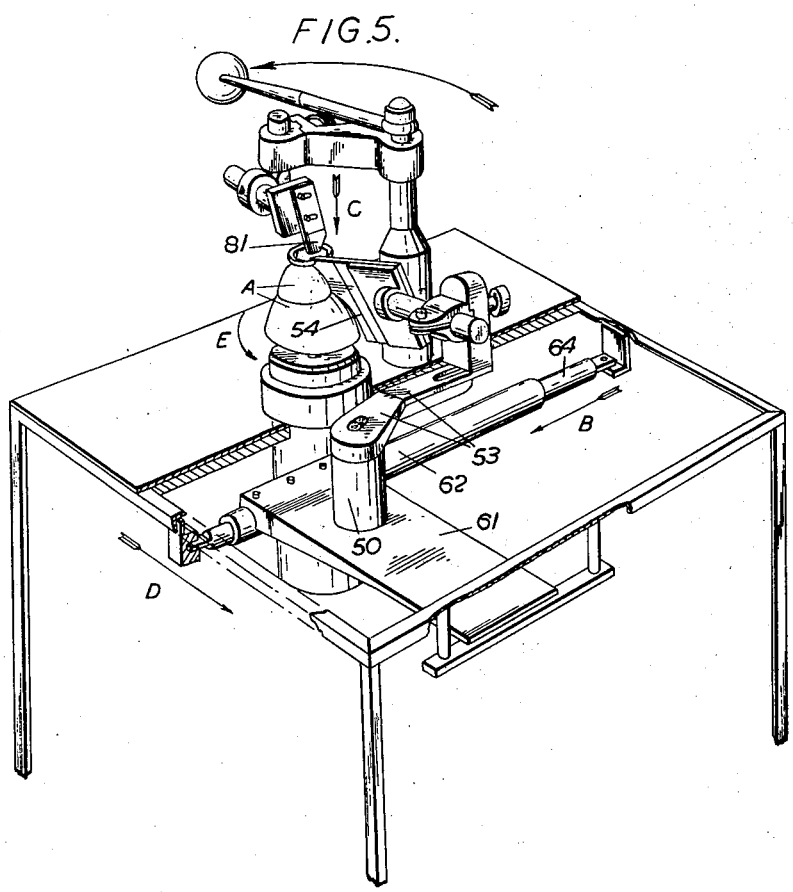
Figure 5 is a perspective view of the upper portion of the machine showing the tools in action upon a clay-ware piece.

A frame 10 is provided carrying an electric motor 11, the spindle 12 of which is disposed vertically and has a pulley 13 fixed on it. The frame 10 also carries a vertical spindle 20 having a chuck 21 at its head, and on the chuck spindle 20 three pulleys 22, 23, 24 are mounted. The bottom pulley 22 is free on the spindle, the middle one 23 is fixed and the top pulley 24 is again free on the spindle. Two of these pulleys are engaged by belts 25, 36. The belt 25 runs at a fairly high speed from the pulley 13. The belt 36 runs at a fairly low speed through suitable reduction gearing 28 from a double-grooved pulley 29 which is driven by a belt 38 from a pulley 37 on the spindle 30 of another motor 31 carried in the frame 10. The pulley 24 has coupled to it a chain sprocket 33 driving a chain wheel 34 by means of a chain 35. The wheel 34 has a cam 40 on its upper face referred to as the traverse cam, a cam 42 on a part of its periphery referred to as the relieving cam, and another cam 43 on its lower face, referred to as the top tool cam. In the frame 10 a tool column 50 is supported which slides to and fro in a slot in a plate on the bench top 52. In Figure 3 the bench top and plate have been broken away so that the slot is not seen, but it has been indicated in outline by the dotted line 51. The tool column 50 has a bracket 53 attached to its head carrying an inclined profile tool 54. The column 50 may carry a seal or cover plate faced with a felt or other pad to allow it to slide smoothly over the bench top 52 and prevent clay cuttings from falling into the mechanism. The lower end of the column 50 is attached by screws 60 to a bracket member 61 having a sleeve 62 which moves slidably to and fro along a slide bar 64. The bracket member 61 has one end of a lever 65 connected to it by means of a pin 63. The other end of the lever 65 is mounted on a fixed pivot 66 and at an intermediate point the lever carries a roller 67 which bears against the traverse cam 40 so that the cam 40 operates the lever 65 and so moves the bracket 61 carrying the tool column 50 backwards and forwards along the slide bar 64. The slide bar 64 is mounted on a fixed pivot 70 at one end and works in a guide 71 at the other; at an intermediate point a link 73 is connected to the bar 64 and the other end of the link is movable in a pivoted bracket 74 on the pivot 66. The link 73 carries a roller 76 which bears against the relieving cam 42. This cam 42 is arranged to come into operation when the tool column 50 reaches the end of its forward traverse (the tool 54 having acted on the clay piece carried by the chuck 21) and by means of the link 73 draws the slide bar 64 and bracket unit 61 away from the chuck 21, so as to relieve the tool 54 and allow it in its rearward traverse to be clear of the clay piece. There is also mounted in the frame 10 a further vertical spindle 80 carrying a tool or tools 81 for acting on the top of the clay piece. The term "top" is used in respect of the position of the piece as it is supported on the chuck 21. It is evident that an article such as a cup would be placed on the chuck inverted, so that the "top" as supported on the chuck would actually be the bottom or foot of the piece in use. The spindle 80 has a boss or the like 82 on its lower end which is engaged by a finger 83 attached to a rocker shaft 84 connected by a link mechanism 85, 86 to a bar 90 carrying a roller 91 which bears against the cam 43, whereby the cam 43 operates the bar 90 and links 85, 86 to rock the shaft 84. Thereby at the appropriate moments the finger 83 is caused to draw the top tool spindle 80 downwards so bringing the top tool 81 to bear upon the work. The spindle 80 passes through a hollow spindle 97 which is in turn housed in a fixed sleeve or bush 95 secured to the bench top 52. The spindle 80 carries a sliding bush 94 which fits outside the hollow spindle 97, a coil spring 98 being housed within the sliding bush 94 which tends to oppose the downward movement of the tool spindle 80 and returns the spindle when the cam 43 allows it to do so. The parts 94, 97 are keyed together by a key 98 and slot 99 so that they can rotate together but the part 97 can slide axially. The hollow spindle 94 carries a lever 100 which engage with a sloping ramp 101 having a recess or catch 102 and the lever 100 is acted upon a trip cam 103 on the chain wheel 34. A bracket 105 attached to a fixed support 104 has a bell-crank lever 106 pivotally mounted thereon, the bell crank 106 having a block or protrusion 107 through which is screwed an adjustable setscrew 108 bearing on a cam 109 carried by the hollow spindle 97. The bell crank lever 106 acts upon a projection or rod 110 to which a plate 11 is attached on which two forks 112, 113 are mounted, which engage with the belts 25, 36 which drive the pulleys 22, 23, 24 on the chuck spindle and thereby raise and lower these belts. A handle 115 is secured to the head of the sliding brush 94 by which it can be given a part rotary movement. When the handle 115 is thus operated the hollow spindle 94 moves the lever 100 carried by the hollow spindle 97 up the sloping ramp 101 and the lever 100 drops into the catch 102. Simultaneously the cam 109 carried by the hollow spindle 97 allows the bell crank 106 to rock and the associated fork unit 111, 112, 113 moves the belts 25, 36 upwards; the direct belt drive 25 from the motor 11 now acts on the middle pulley 23; instead of on the lower free pulley as shown in Figure 2. The chuck spindle 20 therefore begins to rotate at its working speed. Simultaneously the belt 36 operated through the reduction gear 28 is transferred to the upper pulley 24 so that the chain wheel 34 begins to be driven at the slow speed formerly imparted to the chuck spindle. The wheel 34 brings the traverse cam into action and the forward traverse of the tool column 50 begins. The top tool cam 43 next comes into action and the rocker shaft 84 brings the top tool 81 down on to the work, so as for instance to form the foot on a cup or the like. In Figure 5 the clay-ware piece is denoted by the reference letter A. The arrow B indicates the direction of the cutting stroke of the main tool 54. The arrow C shows the direction of the cutting stroke of the top tool 81. The arrow D indicates the direction of movement by which the tool 54 is relieved or withdrawn at the end of the cutting stroke so that it can make its return movement without touching the clay-ware piece A. The arrow E indicates the direction of rotation of the chuck supporting the clay-ware piece, the axis of rotation being vertical. In this figure the tool 54 is seen in action upon a hollow-ware article A which is supported with its closed end uppermost and the tool 81 is in action or about to descend into action on the foot or (as supported on the chuck) upper end of the article.

At the end of the forward traverse the relieving cam 42 operates and the return traverse begins under the action of a spring or weight 120 carried by a chain 121. Finally the trip cam 103 disengages the lever 100 from the catch 102 in the ramp 101 and the action of the spring 98 returns the sliding brush 94 and operating handle 115. The cam 109 on the hollow spindle 97 rocks the bell-crank 106 and the fork unit 111, 112, 113 moves the driving belts 25, 36 to their former positions in which the chuck spindle 20 idles and the chain wheel 34 is stationary. The peg 125 is formed on the boss 82 to act as a safety device. If the starting handle 115 has been pulled round sufficiently for the peg to engage the finger 83 the operation of the top tool can proceed but if the handle has not been pulled far enough the finger moves through its arc without engagement with the peg, so that the top tool is thereby prevented from descending in the wrong position which could perhaps cause the tools to clash. The return stroke of the tool column 50 is effected by a weighted chain 145 attached to the column at 146. The chuck 21 has ports 130 communicating through a duct in the spindle 20 with a vacuum pipe 131 leading to a relief valve 132, the valve body 133 enclosing a spring 134 which normally holds the valve 132 up to close ports 135 to atmosphere. The valve 132 is operable by a stem 136 engaged by a block 137 actuated by a rod 138 from a pedal or other control device 139 against the action of a spring 140. The vacuum pipe continues at 141 from the valve body to a vacuum pump 142. When the relief valve is opened to break the suction line by opening the ports 135 the vacuum effect at the chuck 21 is broken. The vacuum pump 142 is driven by the double pulley 37 before-mentioned, from the motor 31. When a cup or other article is fitted on to the chuck a cavity is formed and the vacuum effect in this cavity holds the article firmly in position while the turning operations are carried out. When it is desired to lift the cup or the like from off the chuck the vacuum is broken by the pedal action.

It is to be understood that while in the foregoing description I have described the preferred embodiment of the invention and the best way of carrying it into effect I do not wish to be restricted to the precise mechanical details set forth. In particular I wish it to be understood that I may employ any other suitable form of mechanical devices for effecting the movement of either the main tool or the top tool or both of them, and I may drive the chuck in any other convenient way. I may also employ any other form of chuck to support the articles to be dealt with. The chuck described in American patent application No. 16,914, now Patent No. 2,529,331 in which I am a co-applicant is suitable, and it is a chuck on those lines which has been indicated, somewhat diagrammatically, in the accompanying drawings.

Having now described my invention, what I claim as new and desire to secure by Letters Patent is:

1. A potter's lathe comprising a chuck, said chuck being adapted to support hollow clay-ware articles closed end uppermost, a reciprocating tool and means for operating it, said reciprocating tool being carried in an inclined position and adapted to traverse progressively the side walls of the hollow-ware articles, and another tool and means for operating it, said other tool being adapted to act on the closed end of the articles.

2. A potter's lathe comprising a chuck, means for rotating the chuck, a main tool said tool being carried in an inclined position and adapted to traverse progressively the side walls of the article supported on the chuck, means for advancing said main tool against an article supported on the chuck, the direction of movement of the main tool being approximately at right angles to the axis of rotation of the chuck, and another tool and means for advancing it against an article supported on the chuck, the direction of movement of the other tool being approximately parallel with the axis of rotation of the chuck, the main tool being adapted to act on the sides of the article and the other tool on the end of it.

3. A potter's lathe comprising a frame, a tool support mounted for to and fro movement in the frame, another tool support mounted for movement in a plane at right angles to the first tool support, a chuck mounted in the frame, means for rotating the chuck, said chuck being adapted to present a clay hollow-ware article to the tools so that the first tool acts progressively on the sides of the article and the second tool on its end.

4. A potter's lathe as claimed in claim 3 having in addition the feature that the chuck includes a vacuum connection by which the article can be held in position by vacuum.

5. A potter's lathe comprising a chuck means for rotating the chuck a tool mounted for movement in a predetermined path substantially parallel with the axis of rotation of the chuck, another tool mounted for movement in a predetermined path substantially at right angles to the axis of rotation of the chuck, operating means associated with said tools, said operating means being adapted to bring the tools to bear on an article supported on the chuck and being so arranged that one tool which is set in an inclined position and acts progressively from one end to the other on the sides of the article and the other on its end, the side tool engaging with one end region of the article first and progressively advancing until it has acted the full extent of the side requiring turning, whereupon the action of the second tool on the end of the article begins.

6. A potter's lathe comprising a chuck, means for rotating the chuck, a cutting tool mounted for movement in a direction at right angles to the axis of rotation of the chuck, means for advancing said tool upon a workpiece carried on the chuck, said tool being carried in an inclined position and adapted to traverse progressively the side walls of the article supported on the chuck, the line of advance of the tool being therefore tangential to the surface of the article.

7. A potter's lathe according to claim 6 having means for relieving and withdrawing the tool at the end of its action on the article, and means for returning the tool in a line parallel with its line of advance but clear of the article.

8. A potter's lathe according to claim 6 in which the chuck is rotated about a vertical axis, and in which the tool is made to advance upon an article supported on the chuck by movement in a horizontal line which is tangential with the external surface of the article.

9. A potter's lathe according to claim 6 in which the chuck is rotated about a vertical axis and in which the chuck is shaped to support articles having one end open and one end substantially closed with the closed end uppermost, in which the tool is made to advance in a horizontal line which is tangential with the external surface of the article and is made to engage first with the external surface of the article nearest to one end and to traverse said surface progressively towards the other end as the tool advance continues.

ARTHUR GODFREY ELLIS.

REFERENCES CITED

The following references are of record in the file of this patent:

UNITED STATES PATENTS

| Number | Name | Date |
|---|---|---|
| 1,551,728 | Burger | Sept. 1, 1925 |
| 1,678,924 | Stringbery | July 31, 1928 |
| 1,751,049 | Miller | Mar. 18, 1930 |
| 1,763,745 | Bayer et al. | June 17, 1930 |
| 2,455,744 | Emerson | Dec. 7, 1948 |
| 2,474,509 | Allen | June 28, 1949 |